(12) United States Patent  (10) Patent No.: US 6,550,450 B2
Spaulding  (45) Date of Patent: *Apr. 22, 2003

(54) TWO-CYCLE ENGINE WITH EXHAUST TEMPERATURE-CONTROLLED IGNITION TIMING

(75) Inventor: Greg Spaulding, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/123,773

(22) Filed: Apr. 16, 2002

(65) Prior Publication Data

US 2002/0152990 A1 Oct. 24, 2002

Related U.S. Application Data

(63) Continuation of application No. 09/568,449, filed on May 10, 2000, now Pat. No. 6,371,082, which is a continuation-in-part of application No. 09/452,657, filed on Dec. 1, 1999, now Pat. No. 6,237,566.

(51) Int. Cl.[7] .................................................. F02P 5/15
(52) U.S. Cl. .............................. 123/406.44; 123/406.55
(58) Field of Search ....................... 123/406.44, 406.55, 123/399, 406.23, 406.24, 406.52; 60/285

(56) References Cited

U.S. PATENT DOCUMENTS

| 3,867,916 A | 2/1975 | Bigalke | 123/406.44 |
|---|---|---|---|
| 3,938,479 A | 2/1976 | Oberstadt | 123/695 |
| 4,015,586 A | 4/1977 | Wahl | 123/406.24 |
| 4,111,010 A | 9/1978 | Minami | 123/406.44 |
| 5,050,551 A | 9/1991 | Morikawa | 123/406.44 |
| 5,535,586 A | 7/1996 | Ohta et al. | 60/285 |
| 5,813,374 A | 9/1998 | Chasteen | 123/73 C |
| 5,867,983 A | 2/1999 | Otani | 123/406.44 |
| 6,109,235 A | 8/2000 | Hoshiba et al. | 123/339.11 |
| 6,135,087 A | 10/2000 | DeGeorge et al. | 123/406.52 |
| 6,425,371 B2 * | 7/2002 | Majima | 123/406.24 |

FOREIGN PATENT DOCUMENTS

JP    362157220    * 7/1987    ............ F02B/11/00

* cited by examiner

Primary Examiner—Tony M. Argenbright
Assistant Examiner—Hai Huynh
(74) Attorney, Agent, or Firm—Merchant & Gould, P.C.

(57) ABSTRACT

A two-cycle internal combustion engine has an ignition timing that varies with engine speed. A plurality of ignition patterns (the relationship between ignition timing and engine speed) are used. The engine exhaust gas temperature is sensed and is used to determine the particular ignition pattern used at a particular time.

21 Claims, 8 Drawing Sheets

# TWO-CYCLE ENGINE WITH EXHAUST TEMPERATURE-CONTROLLED IGNITION TIMING

CROSS REFERENCE TO RELATED APPLICATION

This application is a continuation of application Ser. No. 09/568,449, filed May 10, 2000, now U.S. Pat. No. 6,371,082, which is a continuation-in-part of Ser. No. 09/452,657, filed Dec. 1, 1999, now U.S. Pat. No. 6,237,566, which application(s) are incorporated herein by reference.

BACKGROUND OF THE INVENTION

The present invention is directed to a two-cycle internal combustion engine and the operation of such an engine. Such engines are used, for example, to drive various vehicles such as snowmobiles, motorcycles, personal watercraft and others.

The operation of such engines is based on the ignition of a compressed fuel-air mixture within a cylinder, with the resulting expansion of the ignited mixture driving a reciprocating piston located in the cylinder. The reciprocating movement of the piston then is used to drive the vehicle powered by the engine.

It is desirable to vary the point during the reciprocation cycle of the piston at which the fuel-air mixture is ignited, i.e. a point between "bottom dead center" and "top dead center", to provide optimum operation of the engine. Thus, as one example the optimum point of ignition during acceleration can differ from that for a normal running operation. Because the piston usually is driven by a rotating crank shaft, the ignition point often is expressed in terms of degrees of advancement with respect to top dead center, in other words the position with respect to degrees of rotation of the rotating crank shaft ahead of the top dead center position.

Typically, different engine operating speeds, which usually are expressed in revolutions per minute, will be associated with different engine conditions. For example, higher engine speeds often are associated with acceleration. Thus, it has been considered that the point of ignition during the reciprocation cycle of the piston should be varied, depending on the engine operating speed at the particular time, and engine ignition control systems can be programmed to vary the ignition point depending on the engine speed.

Other factors can affect the optimum ignition timing. For example, an engine operating shortly after start-up may require a different relationship between ignition timing and engine speed (hereinafter "ignition pattern") than an engine that has been operating from some time. Consideration has been given in the past to a system that allows the user to switch between two different ignition patterns. This has not been completely satisfactory in optimizing engine performance.

SUMMARY OF THE INVENTION

The present invention seeks to provide a two-cycle engine that enjoys improved performance by selecting from a plurality of relationships between ignition timing and engine speed (ignition patterns) based on exhaust gas temperature. In one aspect of the present invention, individual ignition patterns cover ranges of exhaust gas temperature of about 50 C. The sensitivity of the control system increases as the temperature range decreases. In another aspect of the present invention the exhaust gas temperature is determined by use of a sensor that is in contact with the exhaust gas, for example in an exhaust pipe. In a further aspect of the invention, a capacitor discharge ignition system is used to control the ignition timing of a spark plug. Yet another aspect of the invention provides for a default ignition pattern when there is a malfunction of the temperature sensor.

DETAILED DESCRIPTION

The present invention will be described with reference to the accompanying drawings. It should be understood that the present invention is not limited to the specific embodiments of this description and the drawings.

Figure 1:
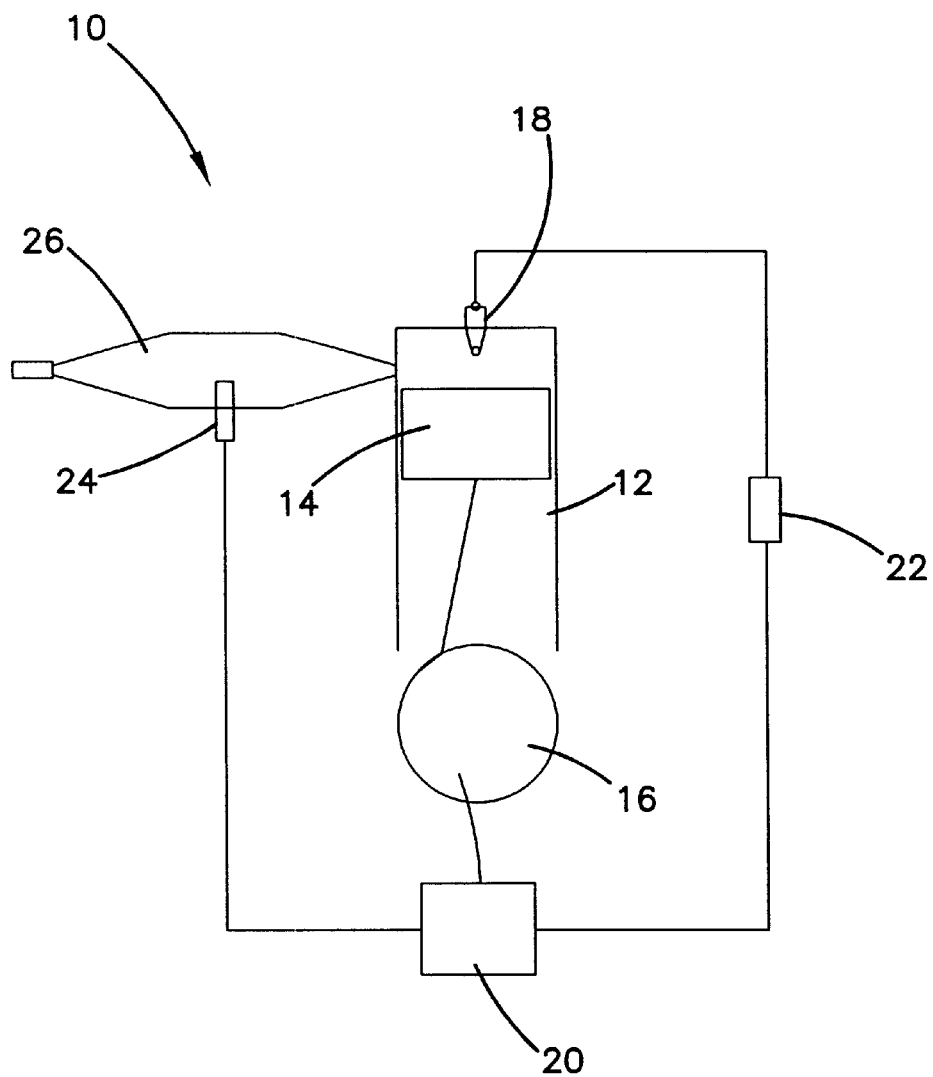
FIG. 1 is a schematic illustration of an example of an engine in accordance with the present invention.

Referring to FIG. 1, a two cycle engine 10 includes a cylinder 12 and piston 14 that moves reciprocally within the cylinder. The movement of the piston 14 may be controlled with a crank shaft 16. Fuel-air mixture introduced into the cylinder is compressed during the upward movement of the piston with in the cylinder and is ignited by an ignition source 18, for example a spark plug. The expansion resulting from the resulting combustion drives the piston downward, thereby imparting rotation to the crank shaft, which in turn can be used to drive a vehicle on which the engine is mounted. Examples of vehicles that typically make use of such two cycle engines include snowmobiles, personal watercraft, motorcycles and the like, although the present invention is not limited thereto. In addition, the present invention could be applied to two cycle engines used in a stationary setting if desired. Exhaust gas resulting from the combustion of the fuel-air mixture is expelled from the cylinder, for example through an exhaust pipe 28. The present invention is not limited to any particular exhaust system, and various combinations of exhaust pipes and manifolds can be used with engines that have more than one cylinder.

Controller 20 is provided for controlling the ignition of the ignition source 18. In one embodiment, the controller is a capacitor discharge ignition system, and activates a spark plug through coil 22. However, other ignition and control systems can be used as well, such as electronic ignition systems. Generally, the ignition should take place while the piston is moving upwardly, i.e. during the compression movement by the piston. Typically the ignition takes place shortly before the piston reaches the end of the compression movement (the "top dead center" position). The ignition timing can be expressed with respect to the rotation of the crank shaft, i.e. in terms of a certain number of degrees before the top dead center position.

Different effects of the combustion can be achieved by varying the ignition timing. Thus, depending on the desired affect, in some cases it is desirable to have an earlier or "advanced" ignition. The circumstances in which particular effects are desired can be correlated to engine speed. Thus, at a particular engine speed a particular advancing of the ignition timing will be used. In some ignition systems, the ignition timing is based only on engine speed (so-called 2-dimensional ignition systems). In other ignition systems, timing is based on engine speed and throttle position (so-called 3-dimensional ignition systems). Both are applicable to the present invention. In any case, the various combinations of ignition timings and particular engine speeds thus will form a particular ignition pattern.

Different engine operating conditions may result in different ignition patterns being desirable. That is, in one circumstance one particular ignition pattern may be the most useful, while another pattern might be better under different conditions. In accordance with the present invention, the exhaust gas temperature is used to evaluate operating conditions and thus determine which of two or more ignition patterns should be selected for engine operation. For this purpose, an exhaust gas temperature sensor 24 is provided. It is preferred that the sensor 24 be in direct contact with the exhaust gas for the purposes of accuracy and reduction in reaction time, for example by being positioned in the exhaust pipe 26. However, it is possible to sense the temperature on the outside of part of the exhaust system or to sense the temperature of water in a water jacket surrounding an exhaust pipe. In the case of a sensor directly contacting exhaust gas in the exhaust pipe or other part of the exhaust system, the sensor should be able to withstand that environment, and suitable measures should be taken to seal the exhaust system at the point where the sensor extends into the exhaust system. An example of a suitable sensor for use in directly contacting the exhaust gas is a thermistor. It is desirable that the sensor be positioned in the exhaust system at a position sufficiently far from the engine to avoid sharp rises and falls (spikes) in temperature of short duration. However, if the sensor is too far from the engine the responsiveness of the system is adversely affected, i.e. there will be too much delay in sensing increases and decreases in temperature. The exact position is determined based on the specific characteristics of the exhaust system involved.

The sensor 24 provides information concerning the exhaust gas temperature to the controller 20. For example, in the case where a thermistor is used as the sensor, the sensor sends an electrical signal whose magnitude changes with changes in the exhaust gas temperature. The controller then selects an ignition pattern based on the exhaust gas temperature information. The selected ignition pattern then is used to control the ignition advance based on the engine operating speed. In this regard, a signal can be sent from the crank shaft to the controller to indicate the engine speed and the relative position of the crank shaft so that the desired ignition timing can be provided.

The controller can process the temperature information as desired. For example, in one embodiment the controller can take the average of several readings, e.g. 10, with the readings being taken by the sensor every 2 milliseconds as one example. Other methods for handling the sensor information can be used as well.

It is desirable to have a plurality of ignition patterns, each of which covers a particular temperature range. As one example, five patterns could be provided, each of which covers a range of about 50 C., for example from 250 C. and lower, 250–300 C., 300–350 C., 350–400 C., 400 C.+ respectively. Different numbers of patterns and different combinations of ranges can be used as desired for a particular practical application, and it is possible to have the different patterns in a single application cover larger and smaller temperature ranges as needed for that particular engine.

A default ignition pattern can be provided for cases where there is a failure in the temperature sensor. Sensor failure can be determined, for example, by the sensor reading temperatures outside expected parameters, e.g. reading above or below certain limits. Thus, as one example, a temperature reading higher than the upper sensor fail limit would be interpreted as a short in a thermistor sensor, while a reading below the lower sensor fail limit would be interpreted as a break in the wiring in a thermistor sensor. It also is possible to allow for user selection of ignition patterns in the event of sensor failure.

It also is possible to use the sensed temperature readings to modify a particular timing pattern that can be selected from a plurality of patterns. For example, the user may be able to select a timing pattern from a plurality of timing patterns using a switch or the like, and the sensed temperatures readings can be used to modify the selected pattern appropriately.

Further, in some cases the desired engine timing pattern may depend on the type of fuel being used in the engine. In such cases, the sensed exhaust temperature may be indicative of the type of fuel and can be used to set the ignition timing pattern accordingly. Thus, the sensed temperature can compensate for the type of fuel used, or can be used to select a timing pattern that would avoid damage to the engine if the fuel selected is not desirable for the engine.

The sensed exhaust temperature also may be useful in indicating some problem in engine performance, e.g. incorrect carburetion or fuel delivery. Again, in this case the sensed temperature can be used to select a timing pattern that avoids damage to the engine.

Figure 2:
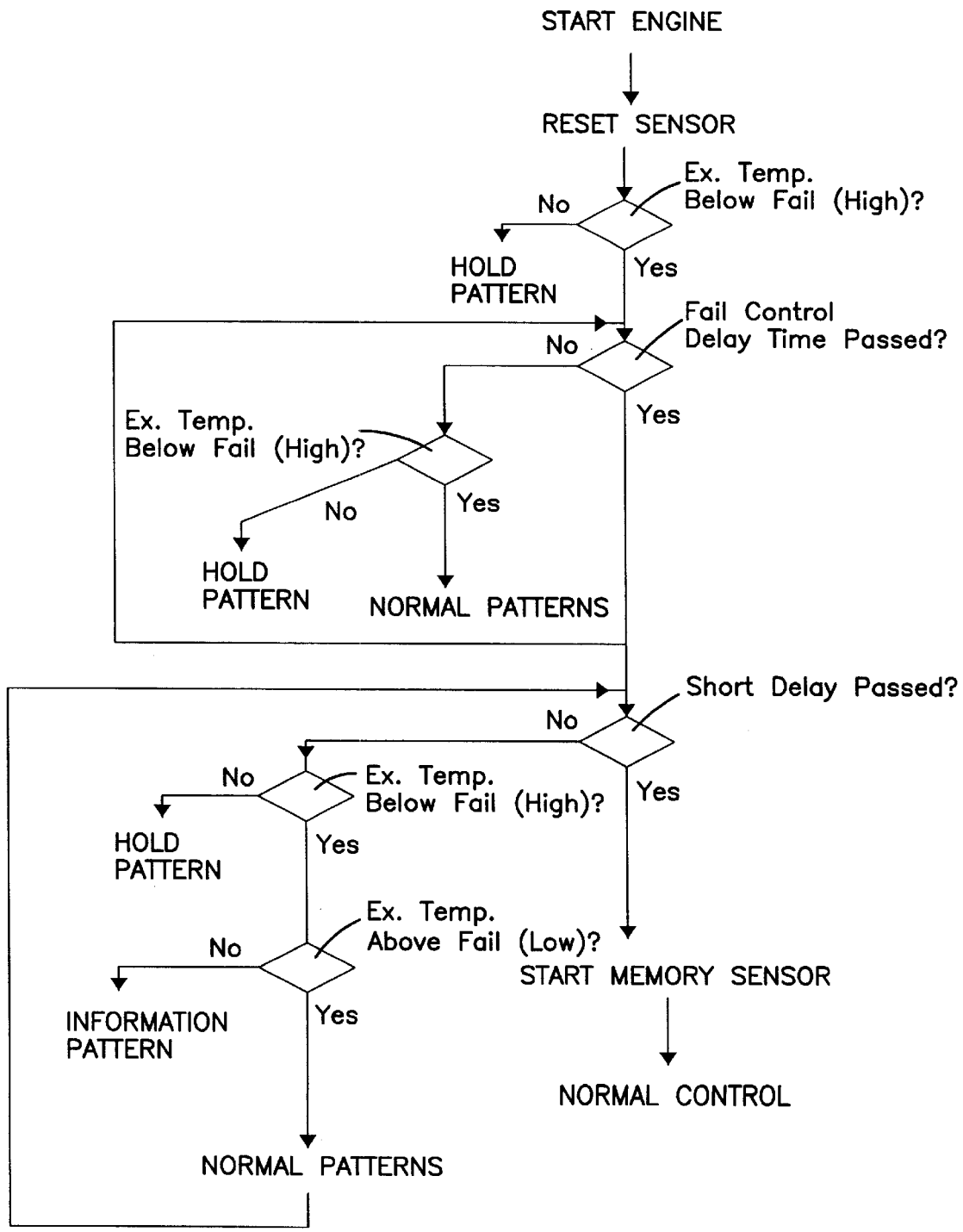
FIGS. 2 and 3 are flow charts illustrating examples of the control of the ignition timing.

An example illustrating the control of the ignition timing will be discussed with respect to FIGS. 2–8. In this embodiment, a thermistor type sensor is used. FIG. 2 illustrates the control from the engine start time. At the time the engine is started, the temperature sensor is reset. The controller then determines whether the temperature information is lower than the upper sensor fail limit temperature, e.g. 600 C. as one example in a case of an engine for a snowmobile. If not, the controller considers that the sensor is shorted out and switches to a "hold pattern", which operates as a default pattern. Any of the available ignition patterns can be used for the default pattern, or the user can be permitted to select one of the available patterns, or a special pattern can be used. If the temperature is below the upper sensor fail limit, the controller continues and determines whether the engine has been running for a sufficiently long period before the fail control is initiated (fail control delay time). Essentially, this permits the engine to run for a period during which the exhaust gas temperature would be expected to exceed the lower sensor fail limit temperature. Until this period is passed, the controller checks only whether the sensor is reading a temperature below the upper sensor fail limit, and if not the "hold pattern" is invoked. The delay period will depend on the lower temperature limit of the sensor, and in the case of a sensor having a lower limit of about 200 C. the delay period generally will be around 10–2500 seconds, with a delay of 120 seconds being typical.

Once the fail control delay time is passed, a further short delay time can be invoked, e.g. on the order of five seconds. This permits the use of a different default pattern during this period under certain circumstances. If the sensor reading is above upper sensor fail limit, the "hold pattern" is invoked. If the sensor reading is below the lower sensor fail limit an "information pattern" can be invoked, which can be the same as or different from the "hold pattern". The information pattern can be such that the pattern would warn the user of sensor failure if a failure indicator light is not provided.

An example of a lower sensor fail limit is 225 C. for a thermistor sensor used in a two cycle snowmobile engine. If the sensor reading is between the upper and lower sensor fail limits, a "normal" pattern is selected. The further delay period should be sufficient for the controller to check for sensor failure, for example about 5 seconds or so.

Figure 3:
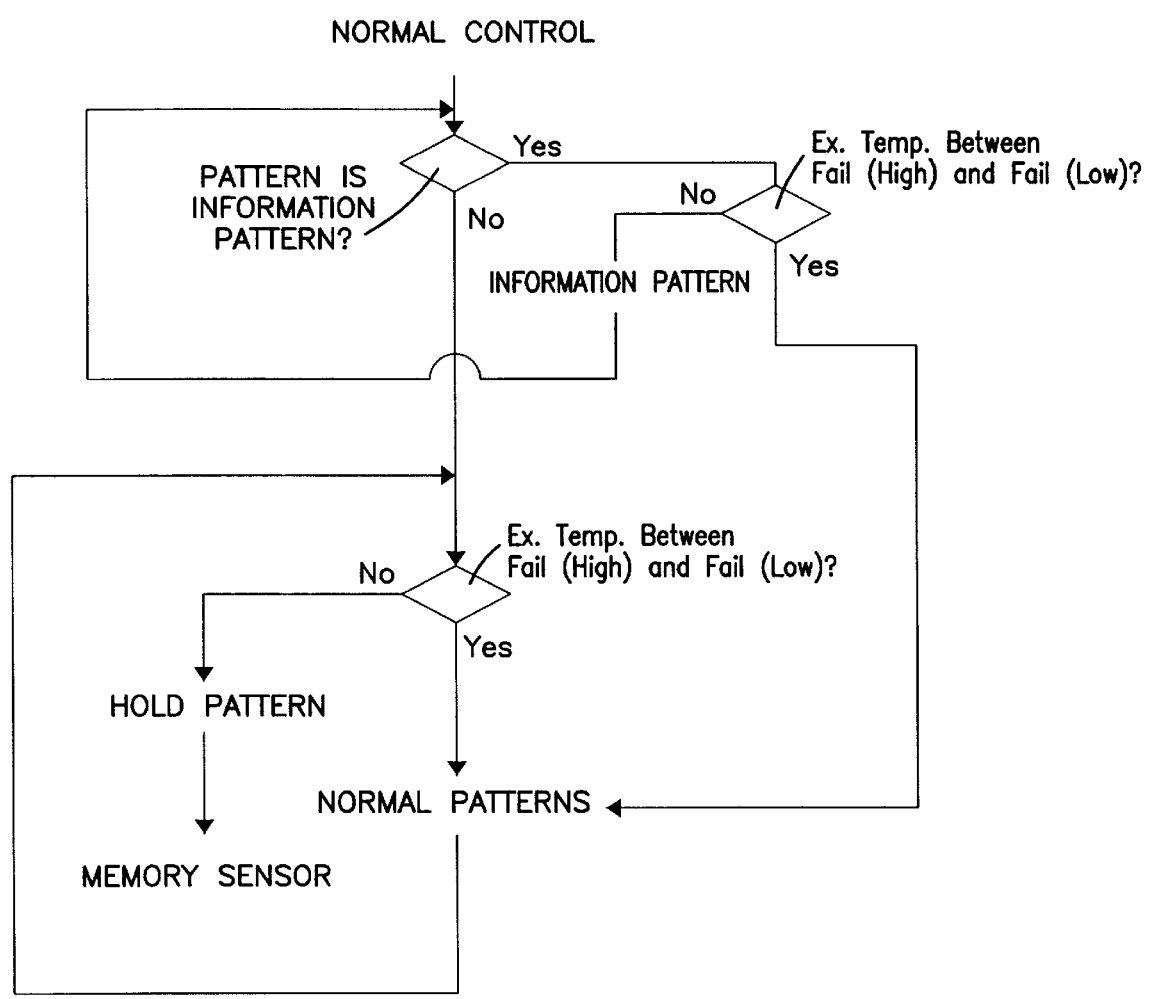
Figure 4:
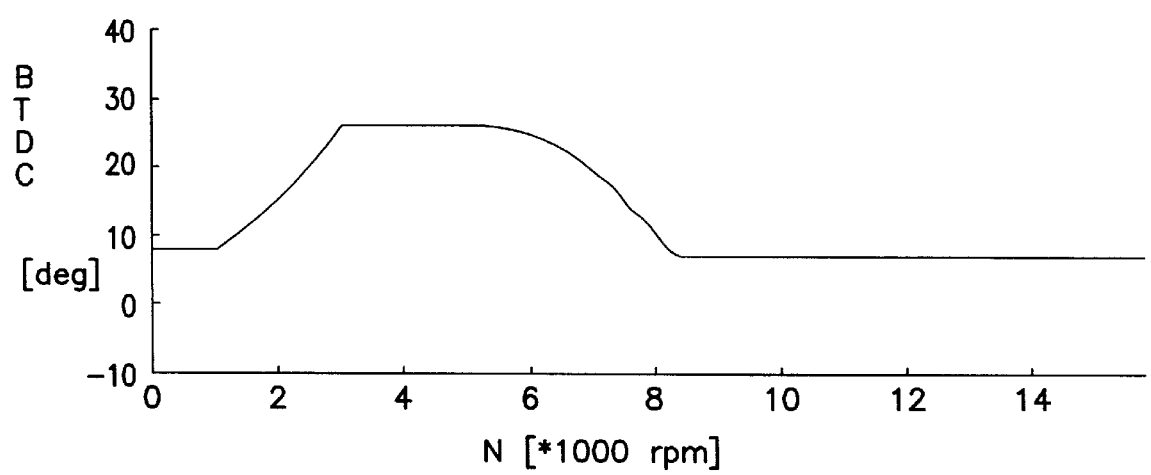
FIGS. 4–8 are graphs illustrating examples of different ignition patterns that can be used in the present invention.
Figure 5:
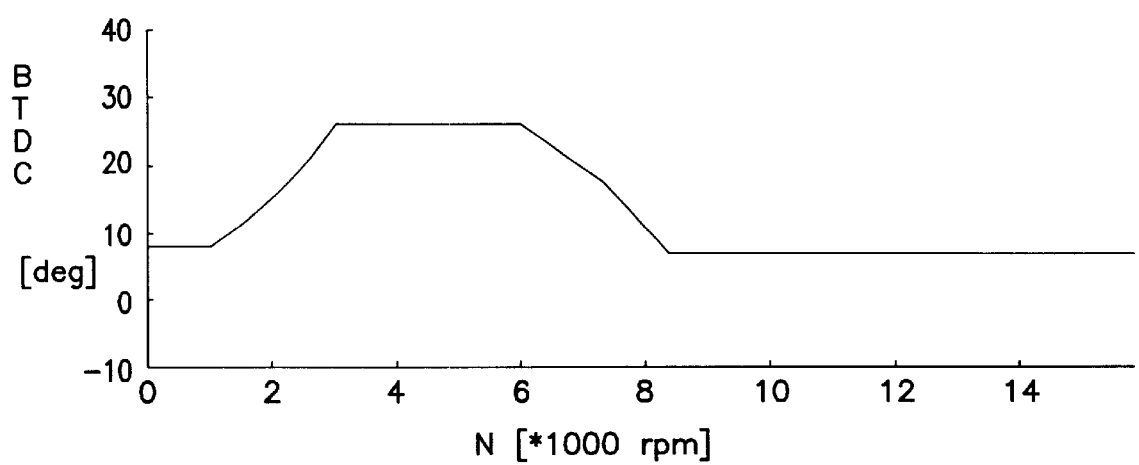
Figure 6:
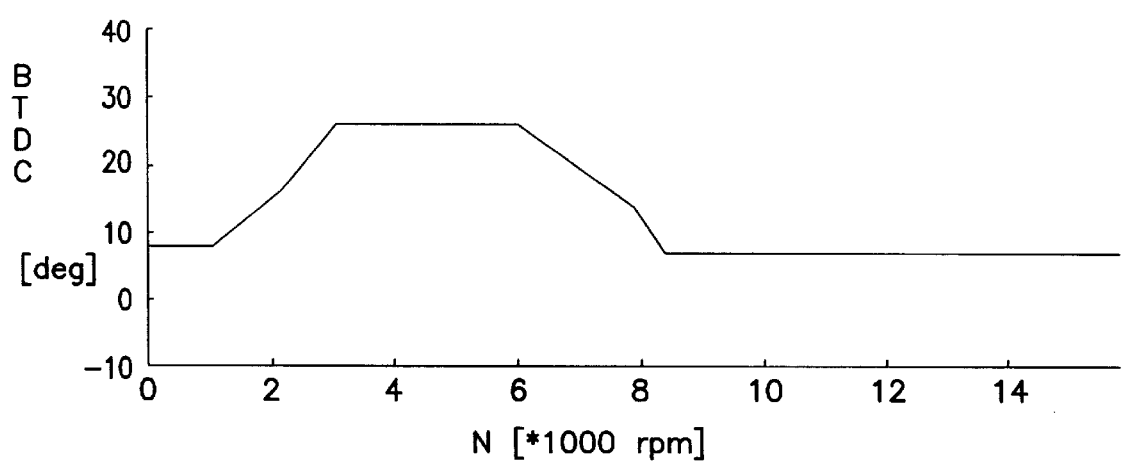
Figure 7:
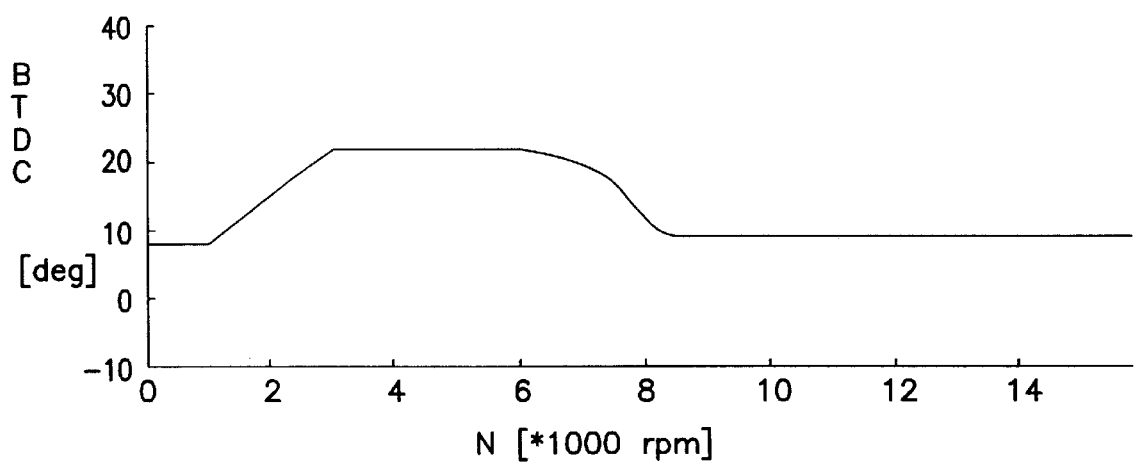
Figure 8:
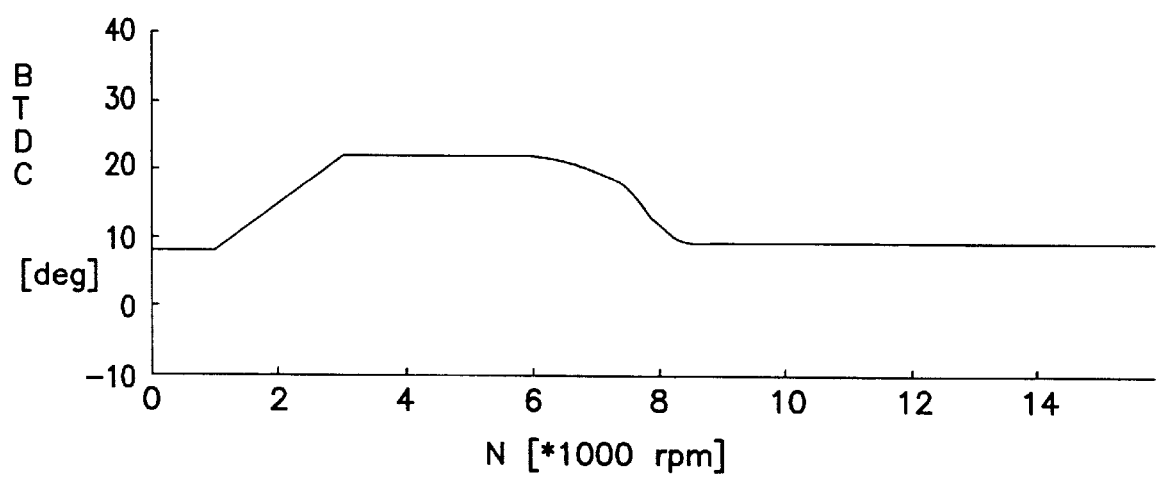

Once the further delay has passed, and assuming the "hold pattern" has not been invoked, the sensory memory function is activated (if sensor output information is to be based on averaged values of previous readings) and normal control is invoked. Referring to FIG. 3, if the "information pattern" was invoked during the further delay, this pattern continues until the exhaust temperature is between the upper and lower sensor fail limits. If the "information pattern" was not invoked during the further delay, i.e. one of the normal patterns was selected, the exhaust temperature is checked to determine whether it is between the upper and lower sensor fail limits. If so, the selection of one of the normal patterns continues. If not, the "hold pattern" is invoked, after which the system can recheck itself to determine whether there has been sensor failure (Start Memory Sensor).

The graphs of FIGS. 4–8 show amount of ignition advance (in degrees before top dead center) as the ordinate versus engine speed (rpm) as the abscissa for five different temperature ranges for a two cycle snowmobile engine. The Figures represent the ignition patterns for 250 C. and lower, 250–300 C., 300–350 C., 350–400 C. and 400 C.+ respectively.

A further example of data that can be used to generate curves of the type shown in FIGS. 4–8 is presented below. In these data, the "angle" represents the number of degrees before top dead center.

A. Exhaust Temperature 250C or less

| RPM | ANGLE |
|---|---|
| 8800 | 7.0 |
| 8600 | 7.0 |
| 8400 | 7.0 |
| 8200 | 8.0 |
| 8000 | 10.0 |
| 7750 | 12.5 |
| 7500 | 14.5 |
| 7250 | 16.0 |
| 7000 | 17.5 |
| 6500 | 20.0 |
| 6000 | 24.0 |
| 5000 | 24.0 |
| 4000 | 20.0 |
| 3000 | 10.0 |
| 2000 | 10.0 |
| 1000 | 8.0 |
| 0000 | 8.0 |

B. Exhaust Temperature 250–300C

| RPM | ANGLE |
|---|---|
| 8800 | 11.0 |
| 8600 | 10.0 |
| 8400 | 7.0 |
| 8200 | 8.0 |
| 8000 | 10.5 |
| 7750 | 13.5 |
| 7500 | 16.0 |
| 7250 | 18.0 |
| 7000 | 19.0 |
| 6500 | 22.0 |
| 6000 | 24.0 |
| 5000 | 24.0 |
| 4000 | 20.0 |
| 3000 | 10.0 |
| 2000 | 10.0 |
| 1000 | 8.0 |
| 0000 | 8.0 |

C. Exhaust Temperature 300–350C

| RPM | ANGLE |
|---|---|
| 8800 | 8.0 |
| 8600 | 8.0 |
| 8400 | 8.0 |
| 8200 | 9.0 |
| 8000 | 13.0 |
| 7750 | 15.0 |
| 7500 | 17.0 |
| 7250 | 19.0 |
| 7000 | 20.0 |
| 6500 | 22.0 |
| 6000 | 24.0 |
| 5000 | 24.0 |
| 4000 | 20.0 |
| 3000 | 10.0 |
| 2000 | 10.0 |
| 1000 | 8.0 |
| 0000 | 8.0 |

D. Exhaust Temperature 350–400C

| RPM | ANGLE |
|---|---|
| 8800 | 10.0 |
| 8600 | 11.0 |
| 8400 | 11.0 |
| 8200 | 12.0 |
| 8000 | 14.0 |
| 7750 | 15.5 |
| 7500 | 18.5 |
| 7250 | 20.0 |
| 7000 | 21.0 |
| 6500 | 22.0 |
| 6000 | 24.0 |
| 5000 | 24.0 |
| 4000 | 20.0 |
| 3000 | 10.0 |
| 2000 | 10.0 |
| 1000 | 8.0 |
| 0000 | 8.0 |

E. Exhaust Temperature 400C or higher

| RPM | ANGLE |
|---|---|
| 8800 | 11.0 |
| 8600 | 11.0 |
| 8400 | 11.0 |
| 8200 | 11.5 |

-continued

E. Exhaust Temperature 400C or higher

| RPM | ANGLE |
|---|---|
| 8000 | 13.0 |
| 7750 | 15.0 |
| 7500 | 18.0 |
| 7250 | 19.0 |
| 7000 | 20.0 |
| 6500 | 22.0 |
| 6000 | 24.0 |
| 5000 | 24.0 |
| 4000 | 20.0 |
| 3000 | 10.0 |
| 2000 | 10.0 |
| 1000 | 8.0 |
| 0000 | 8.0 |

The present invention has been discussed with respect to a reciprocating piston engine. The selection of different ignition patterns based on exhaust temperature also is applicable to other types of internal combustion engines, such as rotary engines.

While a detailed discussion of the present invention has been provided above, this should be considered as illustrative and not limiting. The present invention is not limited to the specific embodiments described herein but rather is defined by the following claims.

What is claimed is:

1. A two-cycle engine, comprising;
   a cylinder;
   a piston movable in the cylinder, for compressing a fuel-air mixture to be ignited in the cylinder, with exhaust gas from combustion of the fuel-air mixture being expelled from the cylinder;
   an ignition source in the cylinder;
   a controller for activating the ignition source at a particular point during the movement of the piston, the controller containing a plurality of ignition patterns, each of said patterns reflecting desired ignition points that vary as a function of the operation speed of the engine; and
   a sensor for sensing a temperature of exhaust gas from the cylinder and for providing a signal to the controller indicative of the temperature of the exhaust gas;
   wherein the controller selects an ignition pattern based upon the sensed exhaust gas temperature.

2. The two-cycle engine as claimed in claim 1, wherein the controller activates the ignition source during the compression movement of the cylinder.

3. The two cycle engine as claimed in claim 2, wherein each of the ignition patterns reflects a desired ignition points at various degrees before a top dead center of the piston.

4. The engine as claimed in claim 1, wherein the ignition source is a spark plug and the controller comprises a capacitor discharge ignition system.

5. The engine as claimed in claim 1, wherein the sensor contacts the exhaust gas.

6. The engine as claimed in claim 1, wherein the plurality of different ignition patterns includes a default pattern that is used if a failure of the sensor is determined.

7. The engine as claimed in claim 1, wherein the engine is a snowmobile engine.

8. The engine as claimed in claim 1, wherein the plurality of ignition patterns have different relationships between ignition point and engine speed.

9. A method of operating a two-cycle engine, comprising:
   moving a piston in a cylinder to compress a fuel-air mixture in the cylinder;
   activating an ignition source in the cylinder during the movement of the piston;
   expelling exhaust gas from combustion of the fuel-air mixture from the cylinder;
   sensing a temperature of the exhaust gas expelled from the cylinder; and
   selecting an ignition pattern from a plurality of ignition patterns based on the sensed exhaust temperature, each of said ignition patterns reflecting desired ignition points that vary as a function of the operation speed of the engine; and
   controlling the activation of the ignition source according to the selected ignition pattern.

10. The method as claimed in claim 9, wherein the activating step occurs during the compression movement of the cylinder.

11. The method as claimed in claim 10, wherein each of the ignition patterns reflects a desired ignition points at various degress before a top dead center of the piston.

12. The method as claimed in claim 9, wherein the ignition spark is a spark plug and the controlling step is performed by a capacitor discharge ignition system.

13. The method as claimed in claim 9, wherein the sensing step is performed by a sensor that contacts the exhaust gas.

14. The method as claimed in claim 9, wherein the temperature of the exhaust gas is sensed with a temperature sensor and the plurality of different ignition patterns includes a default pattern that is selected when a failure of the temperature sensor is determined.

15. The method as claimed in claim 9, wherein the engine is a snowmobile engine.

16. The method as claimed in claim 9, wherein the plurality of ignition patterns have different relationships between ignition point and engine speed.

17. A method of operating a two-cycle engine having a piston movable within a cylinder, an ignition source to ignite fuel in the cylinder, an exhaust system for carrying exhaust gas expelled from the cylinder, and a controller for controlling activation of the ignition source, the method comprising:
   storing a plurality of ignition patterns in the controller, each of said ignition patterns reflecting desired ignition points that vary as a function of the operation speed of the engine at a particular range of exhaust gas temperatures;
   moving the piston in the cylinder to compress a fuel-air mixture in the cylinder;
   activating the ignition source in the cylinder during the compression movement of the piston;
   expelling exhaust gas from the cylinder;
   sensing a temperature of the exhaust gas expelled from the cylinder; and
   selecting a desired ignition pattern based on the sensed exhaust gas temperature; and
   controlling the activation of the ignition source according to the selected ignition pattern.

18. The method as claimed in claim 17, wherein each of the ignition patterns reflects a desired ignition points at various degrees before top dead center of the piston.

19. The method as claimed in claim 17, wherein the sensing step is performed by a sensor that contacts the exhaust gas.

20. The method as claimed in claim 17, wherein the temperature of the exhaust gas is sensed with a temperature sensor and the plurality of different ignition patterns includes a default pattern that is selected when a failure of the temperature sensor is determined.

21. The method as claimed in claim 17, wherein the plurality of ignition patterns have different relationships between ignition point and engine speed.

* * * * *